United States Patent
Goldfarb

(10) Patent No.: US 10,324,674 B1
(45) Date of Patent: Jun. 18, 2019

(54) SYSTEM AND METHOD FOR OPTIMIZING NAME TAG ISSUANCE FOR A CONFERENCE

(71) Applicant: Norman H Goldfarb, San Francisco, CA (US)

(72) Inventor: Norman H Goldfarb, San Francisco, CA (US)

(*) Notice: Subject to any disclaimer, the term of this patent is extended or adjusted under 35 U.S.C. 154(b) by 0 days.

(21) Appl. No.: 15/886,641

(22) Filed: Feb. 1, 2018

(51) Int. Cl.
*G06F 3/12* (2006.01)
*G06F 17/21* (2006.01)

(52) U.S. Cl.
CPC ........... *G06F 3/1256* (2013.01); *G06F 3/121* (2013.01); *G06F 3/1207* (2013.01); *G06F 3/1208* (2013.01); *G06F 3/1287* (2013.01); *G06F 17/212* (2013.01); *G06F 17/217* (2013.01)

(58) Field of Classification Search
None
See application file for complete search history.

(56) References Cited

U.S. PATENT DOCUMENTS

| | | | | |
|---|---|---|---|---|
| 2003/0041068 | A1* | 2/2003 | Camarillo | G06F 17/30569 |
| 2004/0099731 | A1* | 5/2004 | Olenick | G07F 17/26 235/380 |
| 2010/0218135 | A1* | 8/2010 | Brugler | G06F 3/0481 715/781 |

\* cited by examiner

*Primary Examiner* — Thomas D Lee
(74) *Attorney, Agent, or Firm* — The Gache Law Firm, P.C.; Russell C. Gache

(57) ABSTRACT

A system is disclosed for creating a badge for a conference attendee. Attendee information is collected and stored in a database along with a series of pre-defined formatting parameters or rules. Those formatting parameters are then applied to the collected attendee information and a draft of attendee badge is created. The draft badge is then forwarded to the attendee for review and alteration, and in parallel reviewed by a badge curator or editor iteratively until the badge is ready for a final inspection. A final inspection is done on the draft badge and it is printed for pickup by the attendee at a conference venue.

6 Claims, 3 Drawing Sheets

SYSTEM AND METHOD FOR OPTIMIZING NAME TAG ISSUANCE FOR A CONFERENCE

FIELD OF THE INVENTION

The present invention relates generally to the display of personal identification material. More specifically, the invention relates to the creation of a name tag used at meetings. In greater particularity, the invention relates to collating and printing personal biographical information onto a name tag for usage at a meeting or a conference.

BACKGROUND OF THE INVENTION

The lowly name tag is a ubiquitous artifact in trade shows, conventions, conferences and other meetings. Its value is essential to a successful conference or convention. Further, the usage of a name tag is rarely discussed, but always expected in organized large group meetings. The reason is that, at conferences and tradeshows, attendees expect to network, and name tags, sometimes referred to as "badges," are essential in the networking process.

Name tags typically include the Attendee's name, job title, and organization. A submitted personal photo or company logo may be displayed. They might also include his or her department in a particular business, a functional business classification such as "finance" or "manufacturing," or may identify a role in the conference, such as a "speaker" or "exhibitor." Sometimes, an origination region or geographical area is also indicated. Since the goal of a name tag is to immediately convey understandable biographical information relevant to its wearer, the selection of that information is important. And, all that information must be packed into a small badge area, which means that the amount and type of information should be carefully selected.

Name tags must satisfy three conflicting challenges: (1) display readily visible and comprehensible information about the wearer, which necessitates a minimum font size; (2) include as much information as possible in a small and reasonably attractive badge size; and (3) present the information in a consistent, accurate and professional manner so attendees can comprehend the displayed information in a quick look at the name tag.

When attempting to satisfy these goals, the following issues can, for example, arise when:
(a) The person's name, job title, and employer name and logo are too long to fit in a defined badge space.
(b) The attendee is not permitted to supplement his formal name with their preferred nickname, such as for example, "Big Daddy."
(c) The attendee is not permitted to include educational or honorific designations, such as "Dr.," "PhD," "J.D."
(d) The attendee intends to replace accurate and useful information, such as "Sales," with inaccurate or deceptive information, such as "Consulting."
(e) The attendee intends to omit significant information, for example replacing "Director of Sales" with "Director."

Hence, what is needed is a system to optimize the content placed onto a collection of name tags to be used in a meeting from a source of attendee biographical information to facilitate the networking goals of the meeting.

SUMMARY OF THE INVENTION

The general objective of the present invention is to create an optimized name tag or badge for a conference attendee. Initially, attendee information is collected and stored along with a series of defined text and badge design formatting and text substitution parameters. Those parameters are then combined with the collected attendee information and a draft of an attendee badge created. The draft badge is forwarded to the attendee for review and alteration, and any changes made by the attendee are reviewed by a badge curator, such as an editor. The drafting-review process proceeds iteratively until the badge is ready for a final inspection. A final inspection is done on the draft badge and then the badge is printed for the attendee at their present location or printed for the attendee to pick-up at the conference.

Other features and objects and advantages of the present invention will become apparent from a reading of the following description, as well as a study of the appended drawings.

BRIEF DESCRIPTION OF THE DRAWINGS

A badge or name tag creation system incorporating the features of the invention is depicted in the attached drawings, which form a portion of the disclosure and wherein.

DESCRIPTION OF THE PREFERRED EMBODIMENTS

Figure 1:
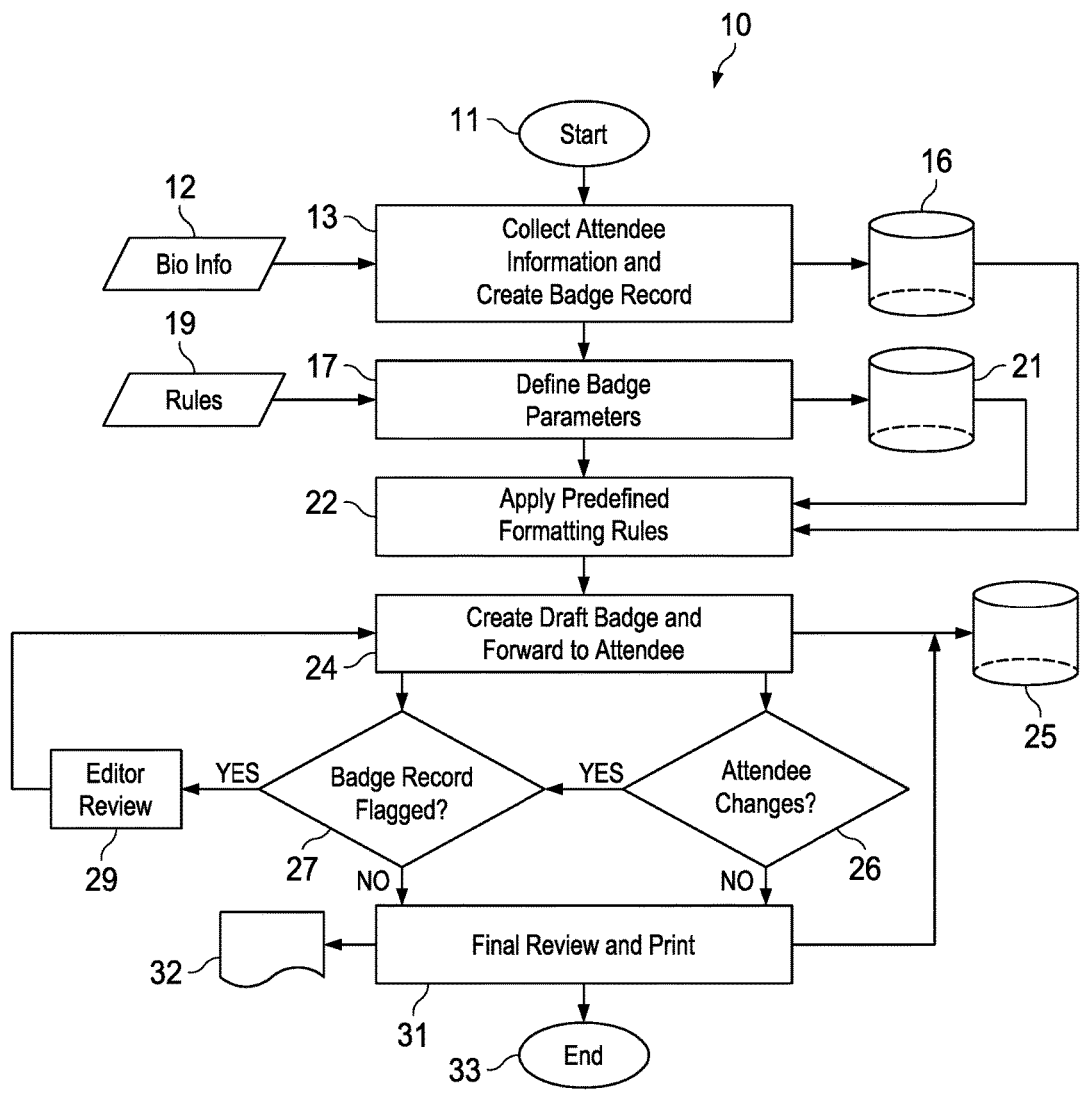
FIG. 1 is a process flow diagram for creating an attendee badge.

Referring to the drawings for a better understanding of the function and structure of the invention, FIG. 1 shows the invention overall system 10 that creates a satisfactory badge for a conference attendee. Initially, biographical information 12 is collected 13 and a badge record created for each conference attendee. Such badge records are collected and stored within database 16. A series of rules 19 are defined and held separately from invention 10 but may be accessed by system 10 upon demand. Rules 19 are intended to be periodically updated and altered, or these rules 19 may also consist of a collection of groups of rules that may be applied to different conference settings and objectives which are invoked for different conference environments. For example, a standard rule set may be established for conferences of varying sizes and complexities. Small conferences, similar to casual meetings, may have a simplified rule set that suits fast and inexpensive generation of name tags. Alternatively, large or multisite conferences may wish to include more complex information on each badge that allows for a greater degree of attendee identification by more people that are attending a conference, and certain categories of attendees might have different badge designs, such as, for example, speakers versus exhibitors. In addition, the system may be configured to accommodate multiple simultaneous, co-located conferences in which each attendee badge record would be assigned a unique identifier and matched with a particular rule set 19 held by database 21.

Once the badge record database is created and badge parameters defined, information from each badge record may then be extracted and accumulated in a format susceptible to placement on a virtual badge 22. This virtual badge is a scaffold upon which a draft badge is created. The system 10 accesses the text of each badge held by database 16 containing the biographical information of each attendee and applies formatting rules 22 responsive to badge parameters held by database 21. The application of the formatting rules 22 allows for the creation of a draft badge 24 that is then forwarded to each attendee for review. The draft badge is also saved in memory 25.

Typically, the draft badge would be forwarded to each attendee via an electronic system such as email, or similar communication system, or the attendee can access the draft via a website. Notification signals would be embedded into each communication, as is known, so that the system 10 monitors whether an attendee has received and viewed each forwarded draft badge.

It will also be noted, as shown in FIG. 1, that in accordance with certain criteria, a badge record may be flagged 27 for editorial review and correction 29. A badge record would be flagged for various reasons. For example, a badge record may be flagged if the alphabetical letters utilized do not accommodate a foreign attendee's different name spelling. Or, a special dignitary status may be recognized and special attention given to the badge content of that particular dignitary to emphasize their position. The badge flagging and editorial review 29 typically would occur in parallel, with each attendee reviewing their own draft badge record. In this manner, an editor may review and correct a badge 29 simultaneously with or even prior to an attendee making their own changes to a badge record. Frequently, and depending upon the timing of the alterations, an editorial change may trigger a new issuance of a draft badge for an attendee as shown. In the event that a badge record is not flagged, each attendee reviews each forwarded draft badge and makes changes to the draft badge 26. Those changes are made manually using a nominal word processing system such as Microsoft Word, or alternatively, each draft badge electronic communication presents a hyperlink from which each attendee may access the draft badge and make changes via an online virtual editing system utilizing a browser of the attendee's choice. In either case, the correction feed-back allows the attendee to indicate their content and formatting desires to be incorporated into the badge configuration.

Alternatively, the attendee may simply print out the draft badge, correct any errors, or make preference changes to the draft badge content, and then mail or fax the corrected badge, to the organization running the system 10 for alteration. Upon receipt of the corrected badge the operator of the system 10 would pass the information along to one of their editors to make corrections to the badge via a client system from which the corrected badge may be accessed and edited 25. As may be understood, the editing system is operated by the system 10 owner and any changes made are automatically saved in memory 25.

After making changes to the draft badge, a final review and print 31 occurs with the badge being printed, typically in a location convenient for the attendee to pick up his or her badge 32, like at a conference venue, or other location and at a time and place convenient for the event organizer and attendee.

Figure 2:
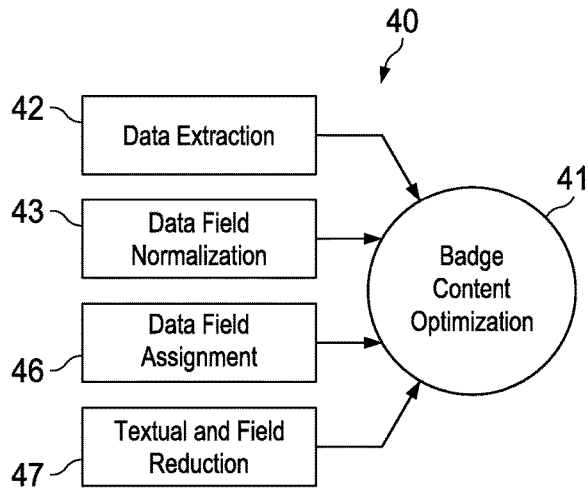
FIG. 2 is an integration chart showing rules used to create badge content optimization.

Referring now to FIG. 2, it may be seen that the badge content optimization process 40 includes four activities, which may be automated, in order to create optimized badge content 41. Data extraction process 42 occurs when a limited portion of the entire data set of the attendee biographical information is extracted and assigned a position associated with badge content. For example, an attendee may provide a great deal more biographical information than is required to create an optimized badge. Although questions and queries sent to an attendee may attempt to curtail an attendee's responses toward an optimized biographical badge profile, inevitably, more content will be collected from some attendees than is required to create a satisfactory badge. Hence, a series of extraction rules are needed in order to accumulate as a tagged subset only the information that will potentially be placed onto an attendee badge.

In addition to data extraction, data field normalization 43 would need to occur so that the displayed content for each badge will display a limited set of content for each field type to enhance recognizability at a conference by other attendees. For example, a limited set of job titles might be adopted as a standardized job title "set" to facilitate recognition by other attendees. Some foreign attendee names might exceed 3 individual words, as is uncommon in Western names, and may be dependent upon the particular nationality and heritage of their culture, which can greatly affect the spelling of their names. However, irrespective of a particular custom for each attendee, the name field might be limited to only 2 full names, for example a first and last name, or maybe with a single initial for a middle name. This would allow for greater recognition of a particular attendee by others who meet the attendee for the first time by reducing the recognition effort, and thereby facilitate continuous networking and recognition of attendees. Likewise with other fields, standardized conventions for titles, geography, salutation, or honorary speaking positions at a conference may be established for badge content.

Also, data fields present in the extracted data set from the superset of attendee biographical information may be assigned an exclusion or inclusion parameter that would control whether or not that biographical content would be included on the attendee badge 46. In other words, an assumption is made that a plurality of biographical field content would be available for inclusion on any badge, but only certain data fields would be actually selected and extracted for inclusion on any badge. Further, each data field extracted from the biographical superset can be assigned a position on the attendee badge depending upon data field assignment rules for the conference and held within rule set 19. For example, a series of fields, such as name, credentials, geographical location, associated corporate entity, speaker position, etc., could each be assigned a particular location on attendee badge layout. By assigning various values to each data field, system 10 permits a widely varying capability to both customize extraction for a field superset as well as make global assignments of biographical field information onto a badge physical layout.

As may be understood, and given the scarcity of space on a conference badge, textual information present within a selected field set pursuant to field assignment process 46 may be reduced to accommodate an optimized badge layout goal 47. Such reduction activity may be comprised of a reduction in words using commonly understood abbreviations or industry acronyms, and/or the reduction in fields included on a badge. Or, a simple truncation of textual information present in a field selected for inclusion on a badge can be implemented. Additional steps appropriate for reduction of space while retaining maximal recognition by a reader can be incorporated as may be known in accordance to each industry being served by a meeting.

Each sub-process 42, 43, 46, 47, is optional but the collection of these sub processes, or activities, result in a greater optimization of badge content 41.

Figure 3:
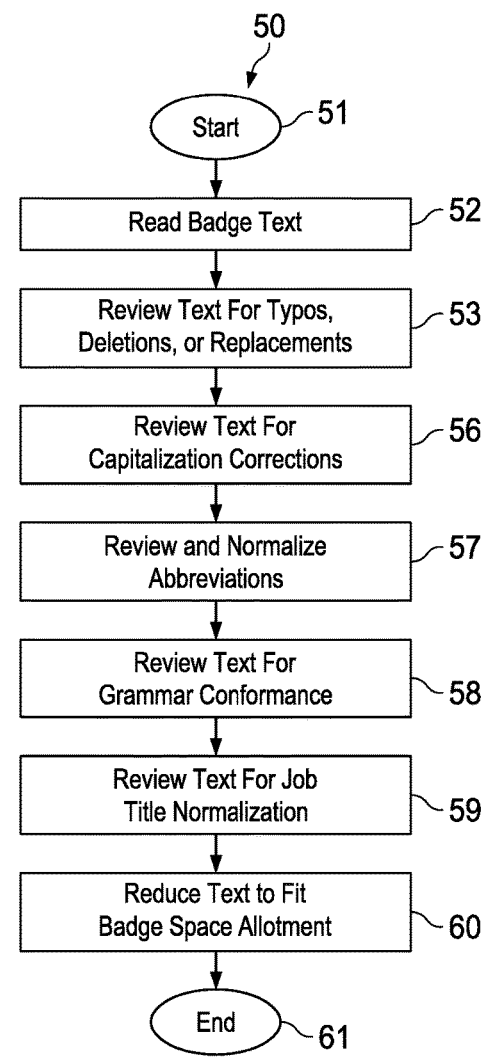
FIG. 3 is a process flow diagram showing badge content optimization.

As shown in FIG. 3, a series of badge correction and editing steps can occur to comprise a final review version prior to printing a badge for an attendee. The steps shown in FIG. 3 would constitute the final review step 31 shown in FIG. 1. However, as may be understood, the steps of FIG. 3 may be implemented as part of the creation of the badge pursuant to step 24 of FIG. 1, instead of reserving it for the final review. Further, utilizing the steps of FIG. 3 may create a better draft badge for review by an attendee, and which may still be optimized further later on by a human editor.

As shown, badge text is read 52 and reviewed for typos, deletions, or replacements 53. Each word is then reviewed 56 for capitalization errors and those errors are corrected pursuant to grammatical norms related to capitalization. Abbreviations are also reviewed and normalized 57 so that those abbreviations meet grammatical norms and/or industry acronym understandings. While grammar is typically secondary in badge creation due to the limited space available, some grammatical errors do occur with the attendee field inputs and hence grammatical rules should be applied to identified text fields to ensure that distracting errors are avoided 58. As with common industry acronyms, job titles have an expected form within various industries and those titles are rewritten, or corrected, to conform with industry expectations. Finally, text for each field included on an attendee badge may be reduced, through various methods, to allow for greater inclusion of information on an attendee badge, or the emphasis of certain information on the badge by varying the appearance of the textual information. The most simple of these methods is to simply shorten the text or reduce the font size of each field 60 in order to fit more badge content on a particular badge, or optimize the visualization of certain badge content with bolding or font variation, or adjust vertical spacing or lines of text. Text flow rules may also be altered to permit the flowing of text around badge photos or company logos, icons associated with an attendee, or the flowing of text into other adjacently positions fields that may have no content, such as a company division field partly occupied by a long organization name. The entirety of process 50 shown in FIG. 3 allows for a great degree of optimization of badge content on an attendee badge.

Figure 4:
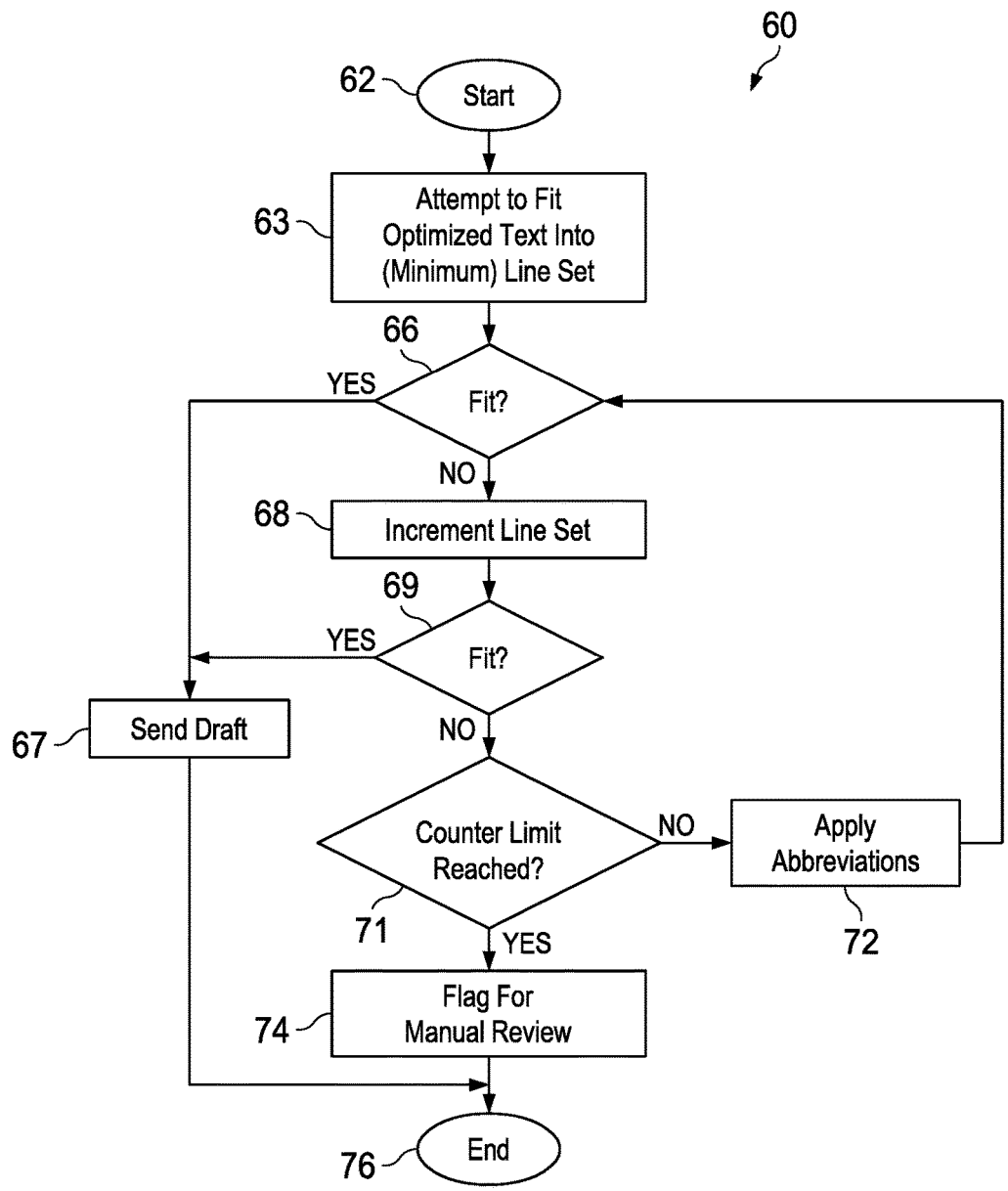
FIG. 4 is a process flow diagram showing badge textual and field reduction.

Referring now to FIG. 4, an example 60 of an algorithm suitable for implementation of step 60 from FIG. 3 may be seen. Initially, an attempt to fit optimized text into a minimum line set (i.e. a specified number of lines) established via rules 19 for an attendee badge is made 63. A determination as to whether or not the text fits on the badge is made 66 and, if it successfully fits in the allotted badge space, a badge draft is sent 67 to the attendee for review. If the text does not fit, a line set value is incremented 68 to allow a greater amount of the text to be included on the attendee badge. An additional determination as to whether or not the text fits on the badge is then made 69. If the text fits the incremented line set space, a draft badge is sent to the attendee for review 67. If the badge content still does not fit, a determination as to whether or not a line set limit has been reached 71 is made and, if it has been reached, the badge record is flagged for manual review by an editor 74. If a line set counter limit has not been reached, content assigned to the badge is reviewed for possible abbreviations of various words 72. An additional space review 66 is completed and the process of line incrementing is resumed until the badge is ready for drafting and sent to the attendee, or the counter limit 71 is reached and a flag set for manual intervention 74. Process 60 is therefore optimized to allow for varying the amount of content placed onto a badge while allowing for abbreviation optimization to fit more content onto a badge for a conference attendee.

In operation, an initial attempt at a meeting badge can be optimized from the following:
Michael Robert WILKERSON, PhD
Executive Vice President, Manufacturing
Intelligent Robotics Division
Acme International Machine Controls Using the above steps described for FIGS. 2-4, the name of the attendee may be shortened to just the first and last names, and a single case with an initial upper case letter has been implemented. The credential "PhD" may be left off to save space. The spelling of the word "Manufacturing" has been corrected. Mr. Wilkerson's title has been abbreviated with a standard and widely recognized abbreviation. The term "Intelligent Robotics Division" has been shortened to the essence of the responsibility of Mr. Wilkerson. And, the company name has been shortened to just the most recognizable portion of the company name.

The above initial process would result in the following badge:
Michael Wilkerson
EVP, Manufacturing—Robotics
Acme International The resultant badge is more easily understood, takes less effort to remember after a quick glance by another attendee, and another attendee can better understand the potential needs and desires of Mr. Wilkerson at the meeting.

While I have shown my invention in one form, it will be obvious to those skilled in the art that it is not so limited but is susceptible of various changes and modifications without departing from the spirit thereof. For example, while I have shown the invention implementation utilizing some computerized elements, it will be understood that those elements can be carried out manually.

Have set forth the nature of the invention, what is claimed is:

1. A process for creating an optimized badge to be used by attendees of a meeting, comprising the steps of:
   a. collecting attendee biographic information;
   b. creating a badge record including said attendee biographical information and storing said record in a database;
   c. establishing a set of optimization rules for configuring text from said badge record for desired display on said attendee badge and applying pre-defined formatting rules to a selected set of information in said badge record for formatting said same, wherein said step of applying formatting rules includes the steps of:
      i. attempting to fit optimized text into a pre-established minimum line set pre-established to fit within a predetermined badge space;
      ii. if the optimized text does not fit within a predetermined badge space using the pre-established minimum line set, increment a minimum line set counter by one;
      iii. attempting to fit said optimized text into the incremented minimum line set and if optimized text does not fit into the incremented minimum line set, determining if a maximum line set value has been reached;
      iv. if the maximum line set value has been reached, flag the record for manual review, and if the maximum line set value has not been reached apply an abbreviation optimization step and determine if the optimized text fits into the badge space; and,
      v. if the optimized capitalization text fits into the badge space, send a draft to the attendee, and if the optimized text does not fit into the badge space flag the record for manual review;

vi. wherein said formatting step includes the step of applying optimization rules selected from the group consisting of data extraction, data field normalization, data field assignment, and textual and field reduction;

d. responsive to said formatting step, creating a draft badge and forwarding said badge to said attendee for review;

e. responsive to input from said attendee review, altering said badge into a final form; and, f. printing said badge in preparation for pickup by said attendee.

2. A process for creating an optimized badge to be used by attendees of a meeting, comprising the steps of:

a. collecting attendee biographic information;

b. creating a badge record including said attendee biographical information and storing said record in a database;

c. applying pre-defined formatting rules to a selected set of information in said badge record for formatting said same;

d. wherein said step of applying formatting rules includes the steps of:
  i. attempting to fit optimized text into a pre-established minimum line set pre-established to fit within a predetermined badge space;
  ii. if the optimized text does not fit within a predetermined badge space using the pre-established minimum line set, increment a minimum line set counter by one;
  iii. attempting to fit said optimized text into the incremented minimum line set and if optimized text does not fit into the incremented minimum line set, determining if a maximum line set value has been reached;
  iv. if the maximum line set value has been reached, flag the record for manual review, and if the maximum line set value has not been reached apply an abbreviation optimization step and determine if the optimized text fits into the badge space; and,
  v. if the optimized capitalization text fits into the badge space, send a draft to the attendee, and if the optimized text does not fit into the badge space flag the record for manual review;

e. responsive to said formatting step, creating a draft badge and forwarding said badge to said attendee for review;

d. responsive to input from said attendee review, altering said badge into a final form; and, f. printing said badge in preparation for pickup by said attendee.

3. A process for creating an optimized badge to be used by attendees at a specified conference, comprising:

a. prior to the date of said specified conference, collecting specified conference attendee biographic information and saving said information in a database;

b. creating a badge record in said database for each said attendee based on information collected in said biographic collecting step;

c. defining at least one set of formatting rules and associating said set with said specified conference via a database file; wherein said step of defining formatting rules includes establishing the steps of:
  i. attempting to fit optimized text into a pre-established minimum line set pre-established to fit within a predetermined badge space;
  ii. if the optimized text does not fit within a predetermined badge space using the pre-established minimum line set, increment a minimum line set counter by one;
  iii. attempting to fit said optimized text into the incremented minimum line set and if optimized text does not fit into the incremented minimum line set, determining if a maximum line set value has been reached;
  iv. if the maximum line set value has been reached, flag the record for manual review, and if the maximum line set value has not been reached apply an abbreviation optimization step and determine
  v. if the optimized text fits into the badge space; and,
  vi. if the optimized capitalization text fits into the badge space, send a draft to the attendee, and if the optimized text does not fit into the badge space flag the record for manual review;

d. establishing a set of optimization rules for configuring text from said badge record for desired display on said attendee badge;

e. processing each badge record associated with said conference in accordance with said associated set of formatting rules and optimization rules to create a draft badge; and, f. printing said badge in preparation for pickup by said attendee at said conference.

4. A process for creating an optimized badge to be used by attendees at a specified conference, comprising the steps of:

a. prior to the date of said specified conference, collecting specified conference attendee biographic information and saving said information in a database;

b. creating a badge record in said database for each said attendee based on information collected in said biographic collecting step;

c. defining at least one set of formatting rules and associating said set with said specified conference via a database file;

d. wherein said set of formatting rules includes the rules of:
  i. attempting to fit optimized text into a pre-established minimum line set pre-established to fit within a predetermined badge space;
  ii. if the optimized text does not fit within a predetermined badge space using the pre-established minimum line set, increment a minimum line set counter by one;
  iii. attempting to fit said optimized text into the incremented minimum line set and if optimized text does not fit into the incremented minimum line set, determining if a maximum line set value has been reached;
  iv. if the maximum line set value has been reached, flag the record for manual review, and if the maximum line set value has not been reached apply an abbreviation optimization step and determine if the optimized text fits into the badge space; and,
  v. if the optimized capitalization text fits into the badge space, send a draft to the attendee, and if the optimized text does not fit into the badge space flag the record for manual review;

e. processing each badge record associated with said conference in accordance with said associated set of formatting rules to create a draft badge; and, f. printing said badge in preparation for pickup by said attendee at said conference.

5. A method for creating an optimized badge to be used by attendees of a meeting comprising the steps of:
   a. step for collecting attendee biographic information;
   b. step for creating a badge record including said attendee biographical information and storing said record in a database;
   c. step for applying pre-defined formatting rules to a selected set of information in said badge record;
   d. wherein said step for applying pre-defined formatting rules includes the steps of:
      i. step for attempting to fit optimized text into a pre-established minimum line set pre-established to fit within a predetermined badge space;
      ii. step for if said optimized text does not fit within a predetermined badge space using the pre-established minimum line set, increment a minimum line set counter by one;
      iii. step for attempting to fit said optimized text into the incremented minimum line set and if optimized text does not fit into the incremented minimum line set, determining if maximum line set value has been reached;
      iv. step for if the prior maximum line set has been reached, flag the record for manual review, and if the maximum line set value has not been reached apply an abbreviation optimization step and determine if the optimized text fits into the badge space; and,
      v. step for if the optimized capitalization text fits into the badge space, send a draft to the attendee, and if the optimized text does not fit into the badge space flag the record for manual review;
   e. responsive to said formatting step, step for creating a draft badge and forwarding said badge to said attendee for review;
   f. responsive to input from said attendee review, step for altering said badge into a final form; and,
   g. said method for creating an optimized badge including step for causing printing of said final form of said badge for pickup by said attendee.

6. A method for creating an optimized badge to be used by attendees of a meeting, comprising the steps of:
   a. step for collecting attendee biographic information;
   b. step for creating a badge record including said attendee biographical information and storing said record in a database;
   c. step for applying pre-defined formatting rules to a selected set of information in said badge record;
   d. step for responsive to said step for formatting for creating a draft badge and forwarding said badge to said attendee for review, wherein said step for creating a badge further includes the steps of:
      i. step for attempting to fit optimized text into a pre-established minimum line set pre-established to fit within a predetermined badge space; and,
      ii. if said step for fitting the optimized text does not permit fitting of text within said badge space, apply a step for optimizing capitalization of said optimized text and if said step for optimizing capitalization does not fit optimized text into the badge space flag the record for manual review;
   e. step responsive to input from said attendee review for altering said badge into a final form; and,
   f. said method for creating an optimized badge including step for causing printing of said final form of said badge for pickup by said attendee.

* * * * *